United States Patent
Weber et al.

(10) Patent No.: US 9,578,404 B2
(45) Date of Patent: Feb. 21, 2017

(54) VEHICLE SOUND SYSTEMS AND RELATED ASSEMBLIES AND DEVICES

(71) Applicant: Bose Corporation, Framingham, MA (US)

(72) Inventors: Martin Amandus Weber, Esslingen (DE); Roland Noller, Koengen (DE); Harald Wanner, Deizisau (DE); Vladimir Malus, Wendlingen (DE)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/692,962

(22) Filed: Apr. 22, 2015

(65) Prior Publication Data

US 2016/0316286 A1    Oct. 27, 2016

(51) Int. Cl.
*H04R 1/00* (2006.01)
*H04R 1/02* (2006.01)
(Continued)

(52) U.S. Cl.
CPC ........... *H04R 1/025* (2013.01); *B60R 11/0217* (2013.01); *H04R 1/021* (2013.01); *H04R 1/2819* (2013.01);
(Continued)

(58) Field of Classification Search
CPC ......... H04R 2499/13; H04R 5/02; H04R 1/00; H04R 1/021; H04R 1/023; H04R 1/086; B60R 11/0217; B60R 2011/0036; B60R 2011/0045; B60R 2499/13; B60R 2011/0052
(Continued)

(56) References Cited

U.S. PATENT DOCUMENTS 5,218,175 A    6/1993    Scarlata
5,394,478 A    2/1995    Hathaway et al.
(Continued)

FOREIGN PATENT DOCUMENTS

EP    0653331 A1    5/1995
EP    1763281 A2    3/2007

OTHER PUBLICATIONS

EP Extended Search Report dated Aug. 19, 2016 for EP16164000.8-1910.

*Primary Examiner* — Curtis Kuntz
*Assistant Examiner* — Julie X Dang
(74) *Attorney, Agent, or Firm* — Bose Corporation (57) ABSTRACT

A vehicle loudspeaker system is provided. The system includes a vehicle body having a trunk floor pan, and a trunk floor that covers the trunk floor pan. The trunk floor has an upper surface and an opposite, lower surface. An electro-acoustic transducer is disposed between the lower surface of the trunk floor and the trunk floor pan. The transducer includes a diaphragm that defines a first radiating surface and a second radiating surface that is opposite the first radiating surface. The electro-acoustic transducer also includes an electro-magnetic motor for driving motion of the diaphragm along a motion axis. The transducer being arranged such that motion axis is within 45 degrees of parallel with the trunk floor. The system also includes a duct that is configured and arranged to direct acoustic energy radiated from the first radiating surface to a region above the upper surface of the trunk floor.

23 Claims, 7 Drawing Sheets

(51) Int. Cl.
*B60R 11/02* (2006.01)
*H04R 9/06* (2006.01)
*H04R 1/34* (2006.01)
*H04R 1/28* (2006.01)
*B60R 11/00* (2006.01)

(52) U.S. Cl.
CPC ............... *H04R 1/345* (2013.01); *H04R 9/06* (2013.01); *B60R 2011/0036* (2013.01); *H04R 2499/13* (2013.01)

(58) Field of Classification Search
USPC ........ 381/86, 302, 388, 334, 365, 389, 71.4, 381/71.7, 301, 41
See application file for complete search history.

(56) References Cited

U.S. PATENT DOCUMENTS

| | | |
|---|---|---|
| 8,396,240 B2 | 3/2013 | Rosen |
| 2010/0074453 A1* | 3/2010 | Ludwig ............... B60R 11/0217 381/86 |

* cited by examiner

VEHICLE SOUND SYSTEMS AND RELATED ASSEMBLIES AND DEVICES

BACKGROUND

This disclosure relates to vehicle sound systems and related assemblies and devices.

SUMMARY

All examples and features mentioned below can be combined in any technically possible way.

In one aspect, a vehicle loudspeaker system is provided. The vehicle loudspeaker system includes a vehicle body having a trunk floor pan, and a trunk floor that covers the trunk floor pan. The trunk floor has an upper surface and a lower surface opposite the upper surface. An electro-acoustic transducer is disposed between the lower surface of the trunk floor and the trunk floor pan. The electro-acoustic transducer includes a diaphragm that defines a first radiating surface and a second radiating surface that is opposite the first radiating surface. The electro-acoustic transducer also includes an electro-magnetic motor for driving motion of the diaphragm along a motion axis. The electro-acoustic transducer being arranged such that motion axis is within 45 degrees of parallel with the trunk floor. The vehicle loudspeaker system also includes a duct that is configured and arranged to direct acoustic energy radiated from the first radiating surface to a region above the upper surface of the trunk floor.

Implementations may include one of the following features, or any combination thereof.

In some implementations, the lower surface of the trunk floor forms a boundary of an enclosed volume, and the electro-acoustic transducer is positioned such that the second radiating surface radiates acoustic energy into the enclosed volume.

In certain implementations, the motion axis is within 15 degrees of parallel with the trunk floor (e.g., 0 degrees to 10 degrees of parallel with the trunk floor).

In some cases, the floor pan forms another boundary of the enclosed volume.

In certain cases, the enclosed volume is acoustically isolated from the region above the upper surface of the trunk floor.

In some examples, the duct extends in a direction substantially perpendicular to the trunk floor.

In certain examples, the electro-acoustic transducer is a low frequency driver for reproducing sounds in the 20 Hz to 2 kHz frequency range.

In some implementations, the electro-acoustic transducer is a subwoofer for reproducing sounds in the 20 Hz to 200 Hz frequency range.

In certain implementations, the vehicle loudspeaker system also includes vehicle interior trim. The vehicle interior trim defines at least a portion of the duct.

In some cases, the vehicle body further includes a rear end body panel, and the rear end body panel and the vehicle interior trim define boundaries of the duct.

In certain cases, the duct is configured and arranged to direct acoustic energy radiated from the first radiating surface to a region above the upper surface of the trunk floor via an aperture in the trunk floor.

In some examples, the trunk floor forms at least a portion of an infinite baffle for the electro-acoustic transducer.

In another aspect, an assembly for a vehicle loudspeaker system is provided. The assembly includes an electro-acoustic transducer which has a diaphragm that defines a first radiating surface and a second radiating surface opposite the first radiating surface. An electro-magnetic motor is provided for driving motion of the diaphragm along a motion axis. The assembly also includes vehicle interior trim which is configured to support the electro-acoustic transducer in a position between a lower surface of a trunk floor and a trunk floor pan, and such that the motion axis of the electro-acoustic transducer is within 45 degrees of parallel with the trunk floor. The vehicle trim defines at least a portion of a duct for directing acoustic energy from the electro-acoustic transducer to a region above an upper surface of the trunk floor.

Implementations may include one of the above and/or below features, or any combination thereof.

Another aspect features a method that includes mounting an electro-acoustic transducer between a lower surface of a trunk floor and a trunk floor pan and such that a motion axis of the electro-acoustic transducer is within 45 degrees of parallel with the trunk floor; and ducting acoustic energy from a first radiating surface of the electro-acoustic transducer to a region above an upper surface, opposite the lower surface, of the trunk floor.

Implementations may include one of the above and/or below features, or any combination thereof.

In some implementations, the step of mounting the electro-acoustic transducer between the lower surface of the trunk floor and the trunk floor pan includes mounting the electro-acoustic transducer to vehicle interior trim such that a second radiating surface of the electro-acoustic transducer radiates acoustic energy into an enclosed volume between the lower surface of the trunk floor and the trunk floor pan.

In certain implementations, the method includes mounting the vehicle interior trim to a body panel of a vehicle such that the vehicle interior trim and the body panel together define at least a portion of a duct for ducting the acoustic energy from the first radiating surface of the electro-acoustic transducer to the region above the upper surface of the trunk floor.

In some cases, the step of mounting the vehicle interior trim to a body panel includes mounting the vehicle interior trim to a rear end body panel such that the vehicle interior trim and the rear end body panel together define at least a portion of a duct for ducting the acoustic energy from the first radiating surface of the electro-acoustic transducer to the region above the upper surface of the trunk floor.

In certain cases, the step of ducting the acoustic energy from the first radiating surface of the electro-acoustic transducer to the region above the upper surface of the trunk floor includes ducting the acoustic energy through an aperture in the trunk floor.

In some examples, the step of mounting the electro-acoustic transducer between the lower surface of the trunk floor and the trunk floor pan includes mounting the electro-acoustic transducer such that a motion axis of the electro-acoustic transducer is within 15 degrees of parallel with the trunk floor.

BRIEF DESCRIPTION OF THE DRAWINGS

Like reference numerals indicate like elements.

DETAILED DESCRIPTION

This disclosure is based, in part, on a way to create a bass in a vehicle trunk without having a bass box. One known idea is to put an infinite baffle woofer into the trunk floor so that the motion axis of the transducer is substantially perpendicular to the trunk floor, but can allow debris to fall onto a diaphragm of the woofer. The solution described herein turns the motion axis of the transducer substantially parallel to the surface of the trunk floor. A rear surface of the woofer radiates into an enclosed volume provided by the vehicle body (trunk pan) and the trunk floor, and a "letter box" shaped duct is positioned adjacent a front surface of the woofer. In this arrangement, debris can land in that duct and the woofer's diaphragm is isolated from that debris. Also, when the woofer is positioned in this way, with the motion axis within 45 degrees of parallel (e.g., substantially parallel) with the trunk floor, it produces less vibration and/or less movement in the trunk floor, which results in better acoustical performance.

Figure 1:
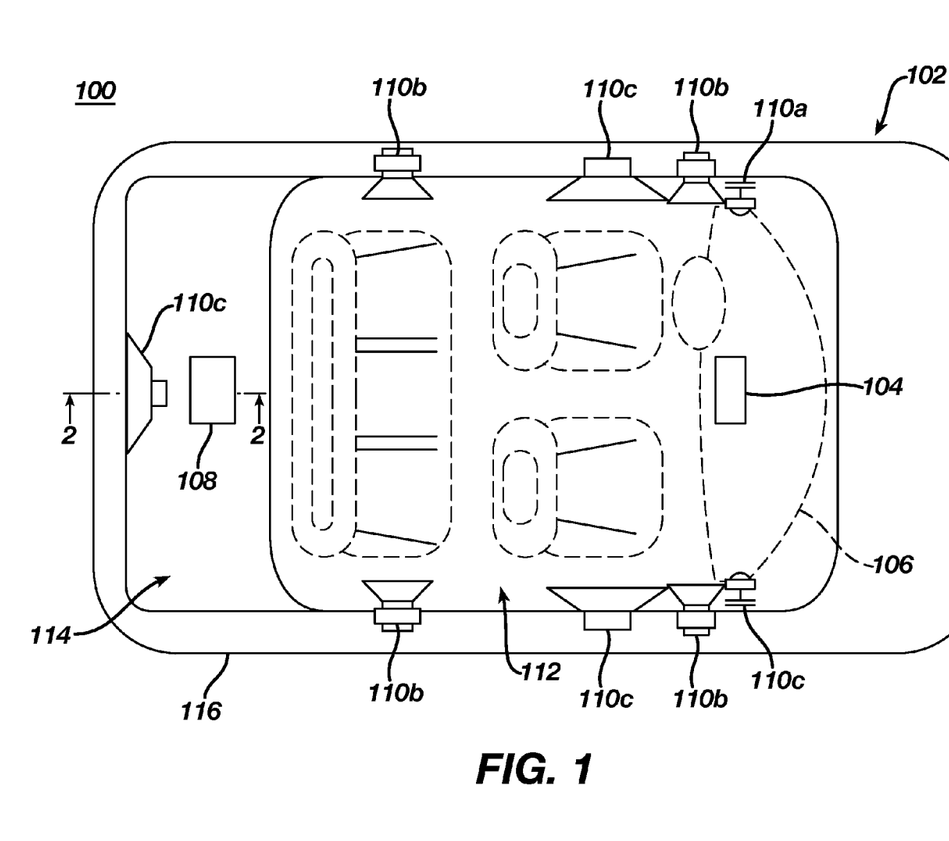
FIG. 1 is a schematic top plan view of a vehicle including a vehicle loudspeaker system.
Figure 2:
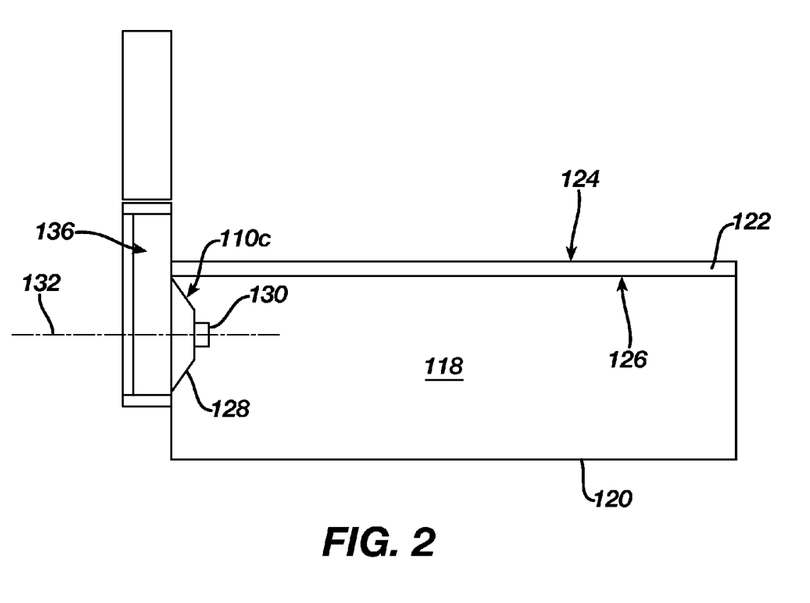
FIG. 2 is a schematic cross-sectional view of a trunk area of the vehicle of FIG. 1, taken along line 2-2.

Referring to FIGS. 1 and 2, there is shown a loudspeaker system 100 installed in a vehicle 102. The system 100 includes a head unit 104 which is typically positioned in an instrument panel 106 of the vehicle 102. The head unit 104 provides entertainment audio to an audio amplifier 108. The audio amplifier 108 amplifies and filters the entertainment audio for distribution to a plurality of electro-acoustic transducers 110a-c (collectively referenced as 110) positioned about the vehicle cabin 112. Wiring (not shown) connects the head unit 104 to the amplifier 108 and the amplifier 108 to the plurality of electro-acoustic transducers 110. In some cases, the functions of the amplifier 108 and the head unit 104 may be packaged in a common housing.

The plurality of electro-acoustic transducers 110 may include transducers of varying size for reproducing sound over a broad frequency range (e.g., about 20 Hz to about 20 kHz). In that regard, the plurality of electro-acoustic transducers 110 may include, inter alia, one or more high frequency drivers (a/k/a tweeters 110a) for reproducing sounds in the 2 kHz to 20 kHz frequency range; one or more mid-range drivers 110b for reproducing sounds in the 300 Hz to 5 kHz frequency range; and one more low frequency drivers (a/k/a woofers 110c) for reproducing sounds in the 20 Hz to 2 kHz range.

Notably, in the illustrated example, the plurality of electro-acoustic transducers 110 includes a woofer 110c which is positioned in a trunk area 114 of the vehicle body 116. As shown in greater detail in FIGS. 2, 3A, and 3B, the woofer 110c is positioned in an enclosed volume 118 between a trunk floor pan 120 and a trunk floor 122. The trunk floor pan 120 is an integral part of the vehicle body 116 and may be formed of a sheet metal, such as sheet steel. The trunk floor 122 is a panel, e.g., wood or composite, that forms part of the vehicle's interior trim and is typically carries a layer of carpeting. The trunk floor 122 includes a substantially planar upper surface 124 (i.e., a majority of the surface area of the upper surface lies in a common plane) and a substantially planar lower surface 126 (i.e., a majority of the surface area of the lower surface lies in a common plane). However, that these surfaces are parallel is not a technical requirement of the acoustical solution. Those surfaces could be any shape as long as they are sufficiently stable (not flimsy) and provide a good enough acoustical seal between surface 126 and the floor pan 120.

The woofer 110c is disposed between the lower surface 126 of the trunk floor 122 and the trunk floor pan 120, and includes a diaphragm 128 and an electro-magnetic motor 130 for driving motion of the diaphragm along a motion axis 132. The woofer 110c is arranged such that the motion axis 132 is within 45 degrees of parallel with the trunk floor 122. In some cases, the motion axis 132 may be substantially parallel with the trunk floor 122. More specifically, the motion axis 132 may be within 15 degrees of parallel with the trunk floor 122, e.g., 0 degrees to 10 degrees of parallel relative to the upper surface 124 of the trunk floor 122.

A rear radiating surface 134 (FIG. 3A) of the diaphragm 128 radiates acoustic energy into the enclosed volume 118 provided by the vehicle body (e.g., the trunk floor pan 120) and the trunk floor 122, and a "letter box" shaped duct 136 is positioned in front of the woofer 110c for directing acoustic energy radiated from a front radiating surface 138 (FIG. 3B) of the diaphragm 128 to a region above the upper surface 124 of the trunk floor 122. In this arrangement, debris (e.g., dirt and/or dust) may land in the duct 136 without contacting the diaphragm 128, and, as a result the diaphragm 128 is isolated from that debris. Also, when the woofer 110c is positioned in this way, with the motion axis 132 parallel with the trunk floor 122, it produces less vibration and/or less movement in the trunk floor 122, which results in better acoustical performance.

The trunk floor pan 120 and the trunk floor 122 together define at least upper and lower portions of an enclosure that is acoustically isolated from the region above the upper surface 124 of the trunk floor 122. The enclosure acts as an infinite baffle for the woofer 110c preventing acoustic energy radiated from the rear radiating surface 134 of the diaphragm 128 from cancelling the acoustic energy radiated from the front radiating surface 138 of the diaphragm 128. The remainder of the enclosure, i.e., the remaining boundaries of the enclosed volume 118, may be provided by interior trim and/or vehicle body panels.

Figure 3A:
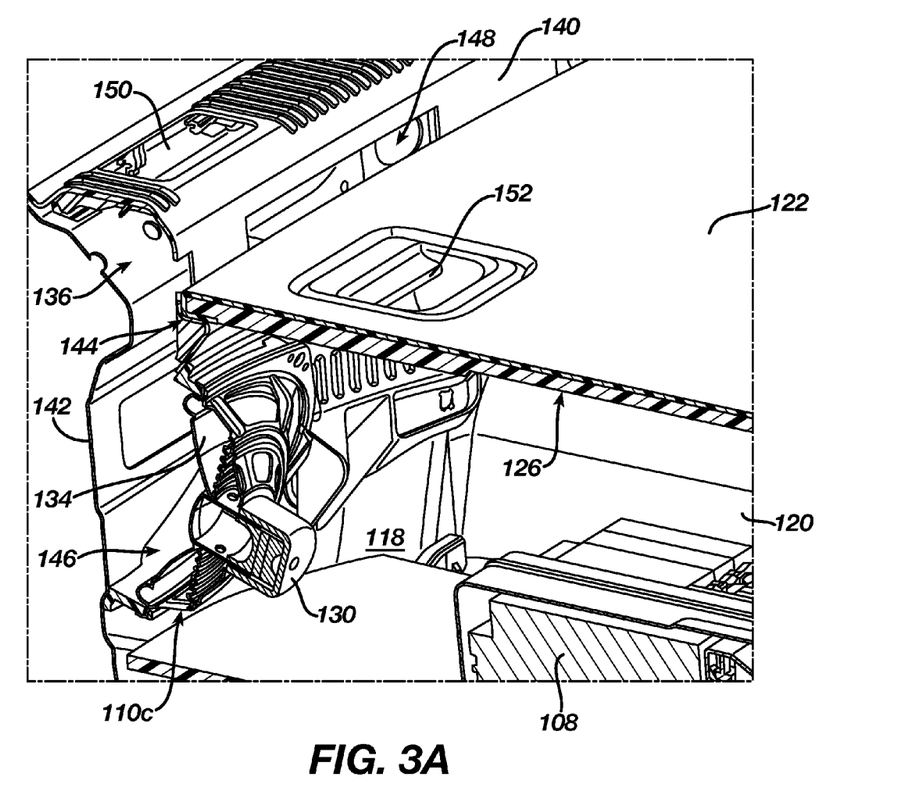
FIGS. 3A and 3B are perspective cross-sectional views of the trunk area of FIG. 2.
Figure 3B:
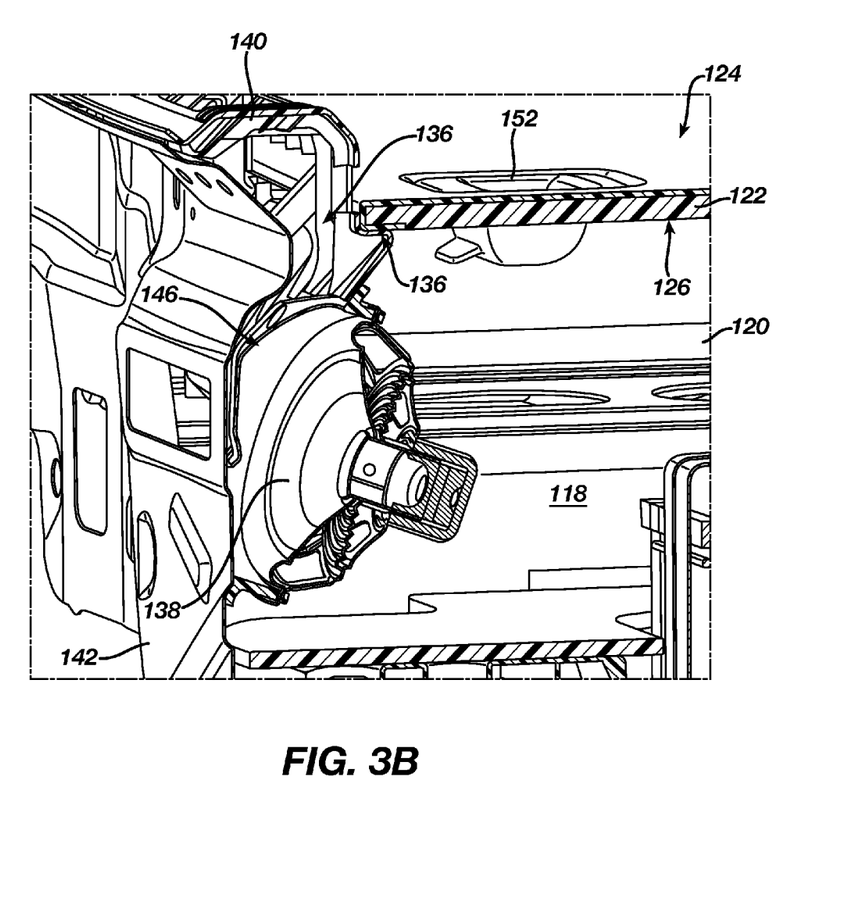

Referring to FIGS. 3A and 3B, a piece of interior trim 140 receives and supports the woofer 110c. In the illustrated example, the trim 140 is configured to cover a rear end body panel 142 of the vehicle body 116 (FIG. 1). The trim 140 and rear end body panel 142 together define at least a portion of the duct 136. That is, the trim 140 and rear end body panel 142 define boundaries of the duct 136. In some cases, an acoustically insulating material may be disposed between the trim 140 and the rear end body panel 142 to further define the shape of the duct 136 (e.g., to define lateral boundaries of the duct 136 that extend between the trim 140 and the rear end body panel 142).

Figure 4A:
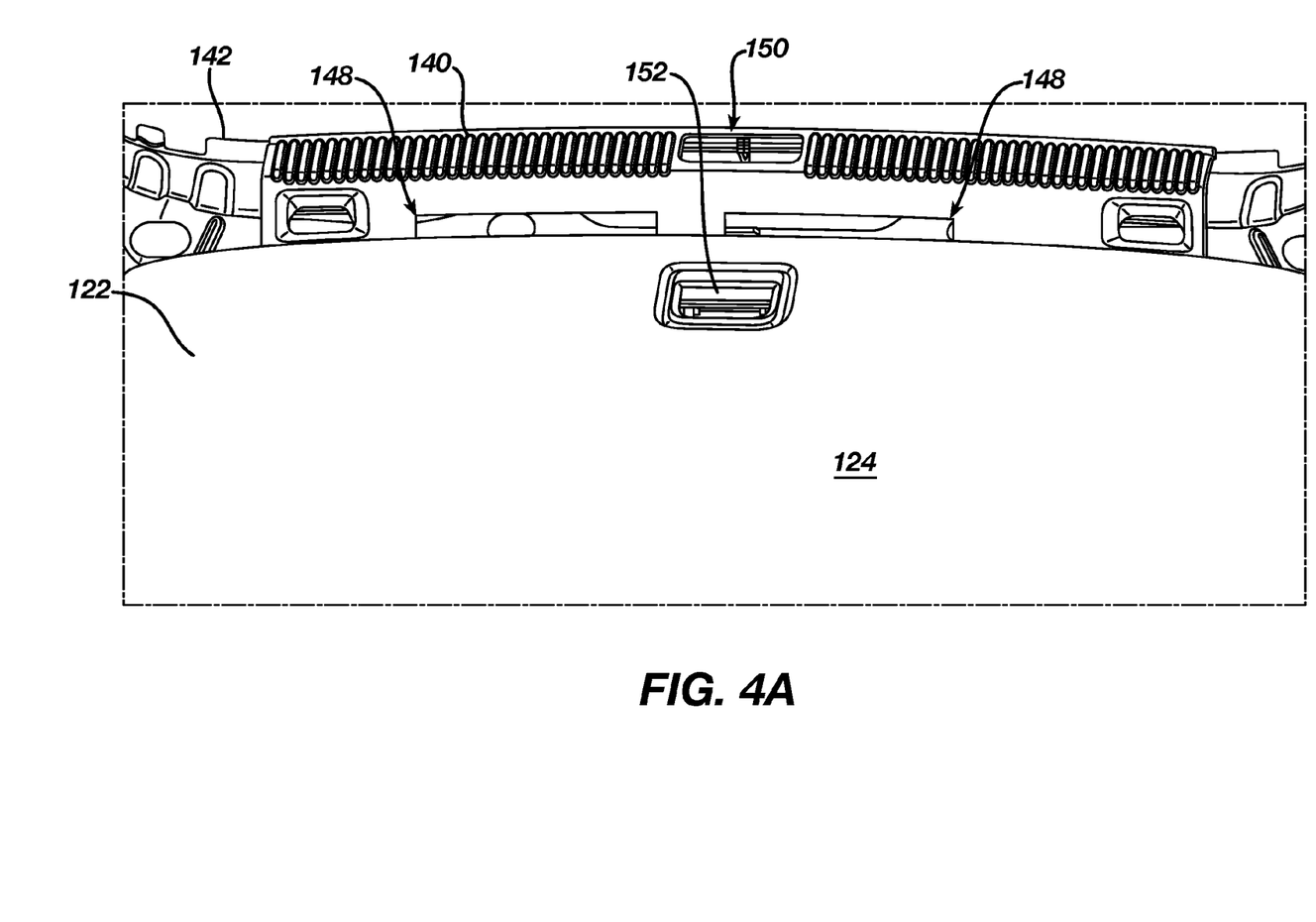
FIG. 4A is a perspective view of the trunk area of FIG. 2 showing an upper surface of a trunk floor.
Figure 4B:
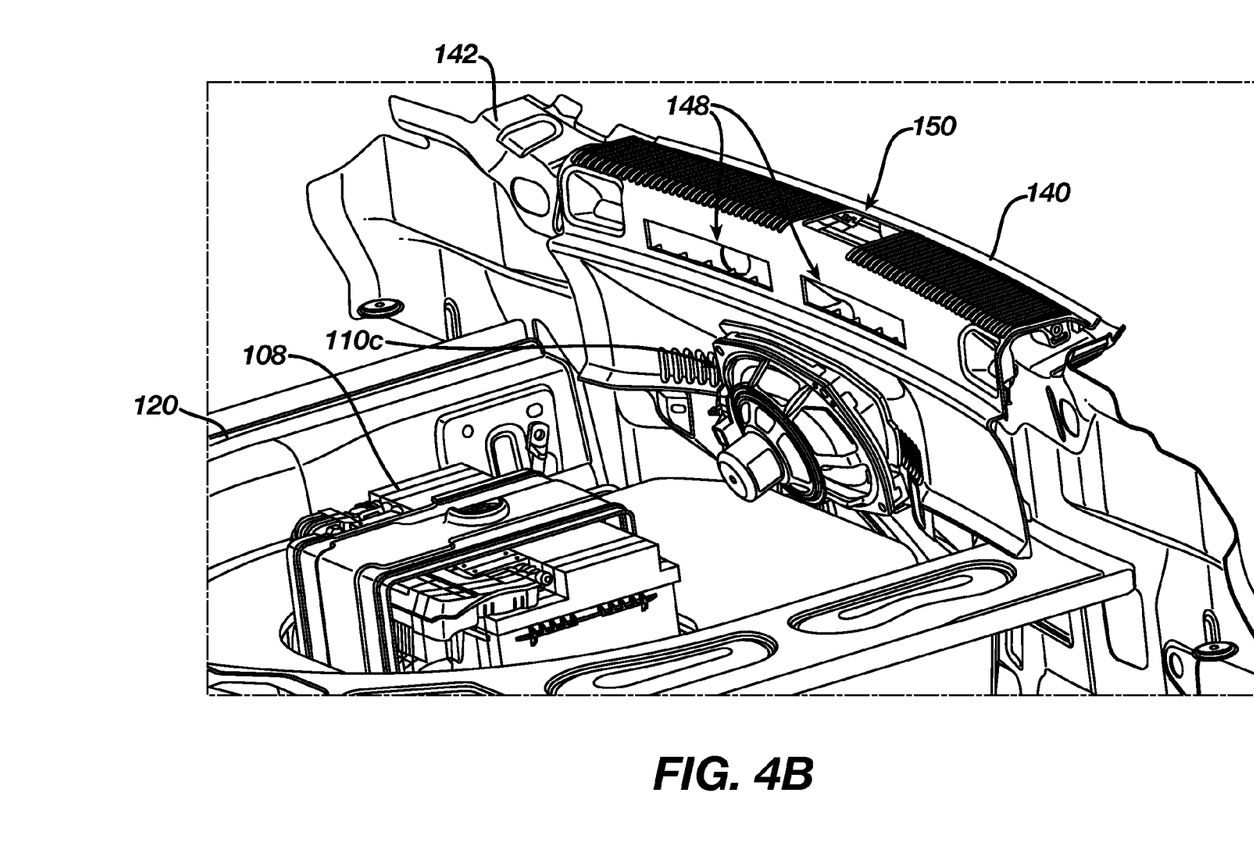
FIG. 4B is a perspective view of the trunk area of FIG. 2 with the trunk floor removed.

The trim 140 defines a shelf 144 for supporting the trunk floor 122. A lower portion of the trim 140, below the shelf 144 defines an aperture 146 through which the woofer 110c communicates with the duct 136. The area of the trim 140 below the shelf 144 and surrounding the aperture 146 forms another portion of the enclosure; i.e., another boundary of the enclosed volume 118. As shown in FIGS. 4A and 4B, an upper portion of the trim 140, above the shelf 144, defines a pair of openings 148 which allow the duct 136 to communicate with the region above the upper surface 124 of the trunk floor 122. In the illustrated example, the openings 148 are positioned generally in the region of a lock box 150 for securing a rear door of the vehicle 102 (FIG. 1). The trim 140 may be formed of a molded plastic (e.g., ABS plastic).

The trunk floor 122 includes a handle 152 which allows the trunk floor 122 to be removed (as shown in FIG. 4B) to permit access the enclosed volume 118 (FIG. 2). As shown in FIG. 4B, the audio amplifier 108 may be disposed within the enclosure. For example, in the illustrated example, the audio amplifier 108 is mounted in the trunk floor pan 120.

Other Implementations

Figure 5:
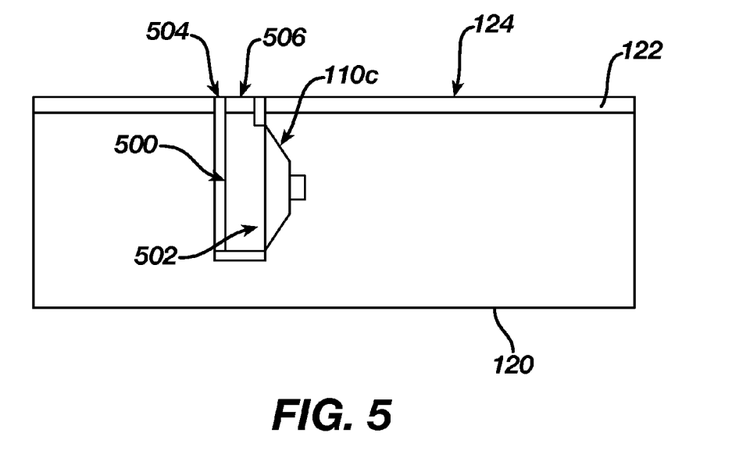
FIG. 5 is an alternative implementation of trunk area having a woofer mounted below a trunk floor.

While an implementation has been described in which a duct is formed, at least in part, by a piece of interior trim, in some implementation, the duct may be formed as a separate, e.g., molded, piece. For example, FIG. 5 illustrates another implementation in which a duct 500 is supported by the trunk floor 122. A first open end 502 connects the woofer 110c to the duct 500 and a second open end 504 is aligned with an aperture 506 in the trunk floor 122. The duct 500 directs acoustic energy radiated from a first radiating surface of the woofer 110c to a region above the upper surface 124 of the trunk floor 122 via the aperture 506. As in the implementation described above, the trunk floor 122 serves to acoustically isolate the front and rear radiating surfaces of the woofer 110c to provide an infinite baffle for the woofer 110c.

In some implementations, the duct may be formed as a separate part (e.g., a separate molded plastic part) that acoustically connects the woofer to the region above the upper surface of the trunk floor via openings in the trim. The duct may, for example, be mounted to and supported by the trim.

While implementations have been described in which a woofer is positioned beneath the floor in the trunk area of a vehicle, in some implementations, other types of electro-acoustic transducers may be positioned beneath the trunk floor. For example, in some cases, a subwoofer for reproducing sounds in the 20 Hz to 200 Hz frequency range may be arranged beneath the trunk floor with its motion axis substantially parallel thereto, and may be ducted, as discussed above, so that acoustic energy radiated from a first surface of the subwoofer is directed toward a region above the upper surface of the trunk floor.

A number of implementations have been described. Nevertheless, it will be understood that additional modifications may be made without departing from the scope of the inventive concepts described herein, and, accordingly, other implementations are within the scope of the following claims.

What is claimed is:

1. A vehicle loudspeaker system comprising:
   a vehicle body comprising a trunk floor pan;
   a trunk floor covering the trunk floor pan, the trunk floor having an upper surface and a lower surface opposite the upper surface;
   an electro-acoustic transducer disposed between the lower surface of the trunk floor and the trunk floor pan, the electro-acoustic transducer comprising:
      a diaphragm defining a first radiating surface and a second radiating surface opposite the first radiating surface; and
      an electro-magnetic motor for driving motion of the diaphragm along a motion axis, the electro-acoustic transducer being arranged such that motion axis is within 45 degrees of parallel with the trunk floor; and
   a duct configured and arranged to direct acoustic energy radiated from the first radiating surface to a region above the upper surface of the trunk floor.

2. The vehicle loudspeaker system of claim 1, wherein the motion axis is within 15 degrees of parallel with the trunk floor.

3. The vehicle loudspeaker system of claim 2, wherein the motion axis is 0 degrees to 10 degrees of parallel with the trunk floor.

4. The vehicle loudspeaker system of claim 1, wherein the lower surface of the trunk floor forms a boundary of an enclosed volume, wherein the electro-acoustic transducer is positioned such that the second radiating surface radiates acoustic energy into the enclosed volume.

5. The vehicle loudspeaker system of claim 4, wherein the floor pan forms another boundary of the enclosed volume.

6. The vehicle loudspeaker system of claim 4, wherein the enclosed volume is acoustically isolated from the region above the upper surface of the trunk floor.

7. The vehicle loudspeaker system of claim 1, wherein the duct extends in a direction substantially perpendicular to the trunk floor.

8. The vehicle loudspeaker system of claim 1, wherein the electro-acoustic transducer is a low frequency driver for reproducing sounds in the 20 Hz to 2 kHz frequency range.

9. The vehicle loudspeaker system of claim 1, wherein the electro-acoustic transducer is a subwoofer for reproducing sounds in the 20 Hz to 200 Hz frequency range.

10. The vehicle loudspeaker system of claim 1, further comprising vehicle interior trim, wherein the vehicle interior trim defines at least a portion of the duct.

11. The vehicle loudspeaker system of claim 10, wherein the vehicle body further comprises a rear end body panel, wherein the rear end body panel and the vehicle interior trim define boundaries of the duct.

12. The vehicle loudspeaker system of claim 1, wherein the duct is configured and arranged to direct acoustic energy radiated from the first radiating surface to a region above the upper surface of the trunk floor via an aperture in the trunk floor.

13. The vehicle loudspeaker system of claim 1, wherein the trunk floor forms at least a portion of an infinite baffle for the electro-acoustic transducer.

14. An assembly for a vehicle loudspeaker system, the assembly comprising:
   an electro-acoustic transducer comprising:
      a diaphragm defining a first radiating surface and a second radiating surface opposite the first radiating surface; and
      an electro-magnetic motor for driving motion of the diaphragm along a motion axis; and
   vehicle interior trim configured to support the electro-acoustic transducer in a position between a lower surface of a trunk floor and a trunk floor pan, and such that the motion axis of the electro-acoustic transducer is within 45 degrees of parallel with the trunk floor,
   wherein the vehicle trim defines at least a portion of a duct for directing acoustic energy from the electro-acoustic transducer to a region above an upper surface of the trunk floor.

15. The assembly of claim 14, wherein the vehicle interior trim is configured to cover at least a portion of a rear end body panel of the vehicle.

16. The assembly of claim 14, wherein the vehicle interior trim is configured to cover at least a portion of a rear end body panel of the vehicle and such that the vehicle trim and the rear end body panel together define at least a portion of the duct.

17. The assembly of claim 14, wherein the electro-acoustic transducer is within 15 degrees of parallel with the trunk floor.

18. A method comprising:
mounting an electro-acoustic transducer between a lower surface of a trunk floor and a trunk floor pan and such that a motion axis of the electro-acoustic transducer is within 45 degrees of parallel with the trunk floor; and
ducting acoustic energy from a first radiating surface of the electro-acoustic transducer to a region above an upper surface, opposite the lower surface, of the trunk floor.

19. The method of claim 18, wherein mounting the electro-acoustic transducer between the lower surface of the trunk floor and the trunk floor pan comprises mounting the electro-acoustic transducer to vehicle interior trim such that a second radiating surface of the electro-acoustic transducer radiates acoustic energy into an enclosed volume between the lower surface of the trunk floor and the trunk floor pan.

20. The method of claim 19, further comprising mounting the vehicle interior trim to a body panel of a vehicle such that the vehicle interior trim and the body panel together define at least a portion of a duct for ducting the acoustic energy from the first radiating surface of the electro-acoustic transducer to the region above the upper surface of the trunk floor.

21. The method of claim 20, wherein mounting the vehicle interior trim to a body panel comprises mounting the vehicle interior trim to a rear end body panel such that the vehicle interior trim and the rear end body panel together define at least a portion of a duct for ducting the acoustic energy from the first radiating surface of the electro-acoustic transducer to the region above the upper surface of the trunk floor.

22. The method of claim 18, wherein ducting the acoustic energy from the first radiating surface of the electro-acoustic transducer to the region above the upper surface of the trunk floor comprises ducting the acoustic energy through an aperture in the trunk floor.

23. The method of claim 18, wherein mounting the electro-acoustic transducer between the lower surface of the trunk floor and the trunk floor pan comprises mounting the electro-acoustic transducer such that a motion axis of the electro-acoustic transducer is within 15 degrees of parallel with the trunk floor.

* * * * *